United States Patent [19]
Sedgwick

[11] 4,059,140
[45] Nov. 22, 1977

[54] TIRE CHANGING MACHINE
[75] Inventor: Jarvis D. Sedgwick, Coon Rapids, Iowa
[73] Assignee: James Sumrall, Bay Spring, Miss.
[21] Appl. No.: 640,632
[22] Filed: Dec. 15, 1975
[51] Int. Cl.² .............................................. B60C 25/08
[52] U.S. Cl. .................................................. 157/1.17
[58] Field of Search ................... 157/1.11, 1.17, 1.26
[56] References Cited
U.S. PATENT DOCUMENTS

| | | | |
|---|---|---|---|
| 2,474,926 | 7/1949 | York | 157/1.26 |
| 3,362,453 | 1/1968 | Nester | 157/1.17 |
| 3,612,140 | 10/1971 | Malinski | 157/1.17 |
| 3,865,172 | 2/1975 | Branick | 157/1.26 |

Primary Examiner—Gary L. Smith
Assistant Examiner—James G. Smith
Attorney, Agent, or Firm—Zarley, McKee, Thomte, Voorhees & Sease

[57] ABSTRACT

A T-shaped frame including a cross member and a telescopic standard is provided with a tire-supporting cradle on one of the standard portions adjacent an upstanding tire-engaging post. A hydraulic cylinder with a bead-engaging tool on its outer free end is pivotally connected to the other telescopic frame member. Adjustment means is provided for angularly positioning the cylinder relative to the horizontal for the tool to engage the bead of a tire. Casters are provided at the corners of the T-shape frame.

5 Claims, 4 Drawing Figures

TIRE CHANGING MACHINE

BACKGROUND OF THE INVENTION

There is a need for an inexpensive, simple in design, tire changing machine that will handle a variety of different sized tires and yet be simple in structural design and easy to operate. It is important that lifting of the tire into position is not required but instead that the tire may be rolled into position. The tire changing machine of this invention satisfies these requirements.

SUMMARY OF THE INVENTION

A T-shape frame is provided having casters at each of its corners. A tire-support cradle extends transversely of the standard portion of the frame which includes two telescopic portions. A hydraulic cylinder having a bead-engaging tool on its free end is connected to the other telescopic portion. A post is positioned on the first frame portion for the tool to press against the tire and the tire in turn against the post. The most effective bead-breaking action is accomplished when the tool engages the bead at the rim at an angle to the horizontal and thus the hydraulic cylinder is positioned either above or below the horizontal. A second post on the opposite side of the cradle from the first post selectively supports the hydraulic cylinder and the bead-engaging tool at the desired angle. Accordingly, the tire is easily worked upon by being merely rolled onto the tire-support cradle and rolled off when the changing operation has been completed. The height of the tire-engaging post may be selectively varied as may the distance from the tool to the post thus allowing the machine to handle different sized tires.

DESCRIPTION OF THE PREFERRED EMBODIMENT

Figure 1:
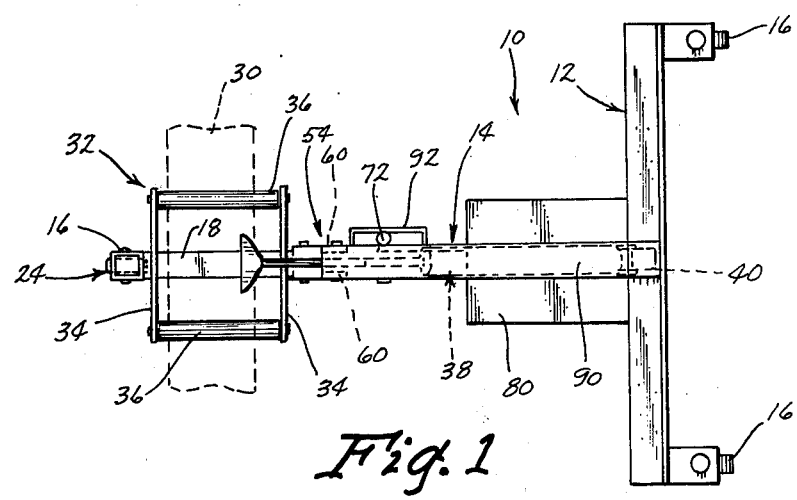
FIG. 1 is a top plan view of the tire changing machine.

The tire changing machine of this invention is referred to generally in FIG. 1 by the reference numeral 10 and includes a T-shaped frame having a cross frame portion 12 and a standard portion 14. Casters 16 are provided at each corner of the T-shaped frame. The standard 14 comprises two telescopic sections 18 and 20 lockingly interconnected by a bolt 22 such that the length of the standard may be selectively varied.

Figure 3:
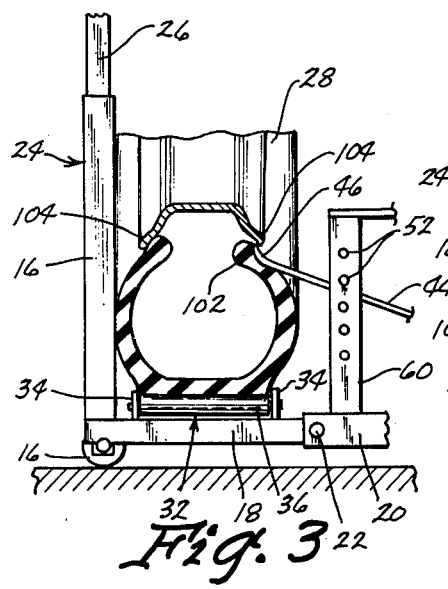
FIG. 3 is a fragmentary cross sectional view similar to FIG. 2 but showing the power cylinder and bead-engaging tool at a different angle as required for working on a larger tire.
Figure 2:
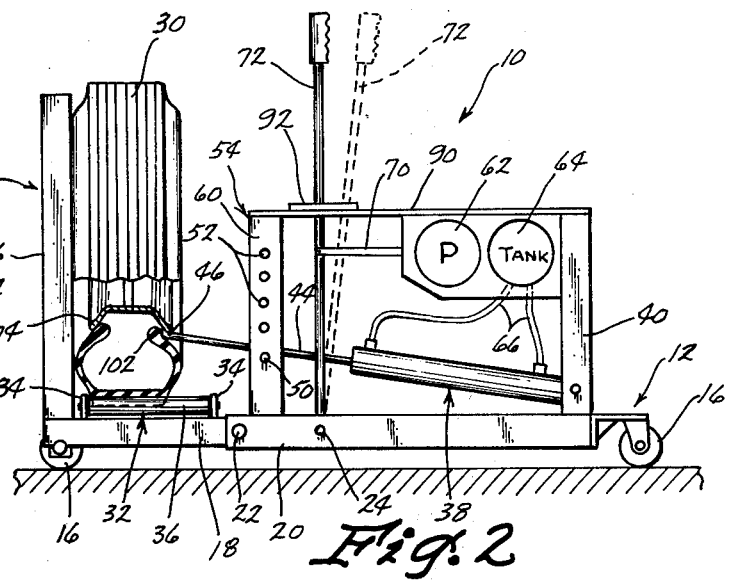
FIG. 2 is a side elevation view thereof.

At the outer free end of the outermost telescopic section 18 of the standard 14 a tire-engaging post 24 is provided which includes a telescopically extendable upper section 26 which may be raised and lowered to accommodate various sized tires such as the tire 28 in FIG. 3 which is larger than the tire 30 in FIG. 2. A tire-support cradle 32 is positioned transversely of the standard frame portion 18, as seen in FIG. 1, and includes a pair of side plate elements 34 interconnected by rollers 36 which allow the tire to be rolled on and off of the cradle 32. The rollers are sufficiently spaced apart to hold the tire in position until it is desired to roll the tire off of the cradle.

A double-acting hydraulic cylinder 38 has its inner end pivoted to an upstanding frame member 40 on the cross frame member 12. A piston rod 44 extending from the cylinder 38 includes a bead-engaging tool 46. The tool 46 and the cylinder 38 are positioned in the same plane normally at an angle to the horizontal and this angle may be varied by selective positioning of support pin 50 in a plurality of vertically spaced apart openings 52 in a post 54 adjacent the cradle 32 on the opposite side thereof from the post 24. The post 54 includes spaced apart side plates 60 between which the tool 46 extends.

The hydraulic cylinder is operated by a pump 62 operatively connected to a reservoir 64. Conventional hydraulic hoses 66 extend to the hydraulic cylinder 38.

The pump 62 is electrically operated and a switch (not shown) may be opened and closed by an actuating link 70 in turn connected to an upstanding lever 72 pivotally connected at 74 to the telescopic frame portion 20. Operation of the lever 72 between the solid and dash-line positions in FIG. 2 opens and closes the switch for operating the pump and the hydraulic cylinder.

An enclosure 80 may be provided around the pump, tank and hydraulic cylinder, as seen in FIG. 1. The upper ends of the posts 40 and 60 are interconnected by a frame member 90 and a guide portion 92 offset from the frame 90 is provided for limiting travel of the actuating lever 72.

In operation it is seen that the post 24 is adjusted for the desired height for the tire to be operated on as is the distance between the tire-bead tool 46 and the post 24. The horizontal spacing between the tool 46 and the post 24 is varied by extension or contraction of the frame standard comprising the telescopic frame portions 18 and 20 interconnected by the bolt 22. The hydraulic cylinder 38 is then angularly adjusted by appropriate positioning of the support pin 50 in one of the holes 52 on the post 60 such that the bead tool 46 engages the tire bead adjacent the rim of the tire at the desired angle to give the most effective breaking action when the power cylinder is extended. The tool 46 is free to pivot upwardly away from the support pin 50 thereby allowing the tool to follow the curvature of the tire as seen in FIGS. 2 and 3. Damage to the tire sidewall, bead 102, and the tool 46 is avoided by allowing the tool to freely pivot above the pin 50 as required during the bead-breaking operation. The power cylinder is selected on the basis that it will have a approximately ten inch stroke. The tire may now be rolled onto the cradle including the rollers 36 at its opposite ends. The cradle is self-centering so that the tire is held in place and limited against rolling out of position. Operation of the cylinder 38 is now caused by the operator moving the lever 72 to the dash-line position in FIG. 2 thereby extending the bead tool 46 against the tire bead and causing it to separate from the rim. Rotation of the tire 28 or 30 on the cradle 32 is easily accomplished on the rollers 36 whereby the bead is separated from its rim around the complete circumference thereof.

Figure 4:
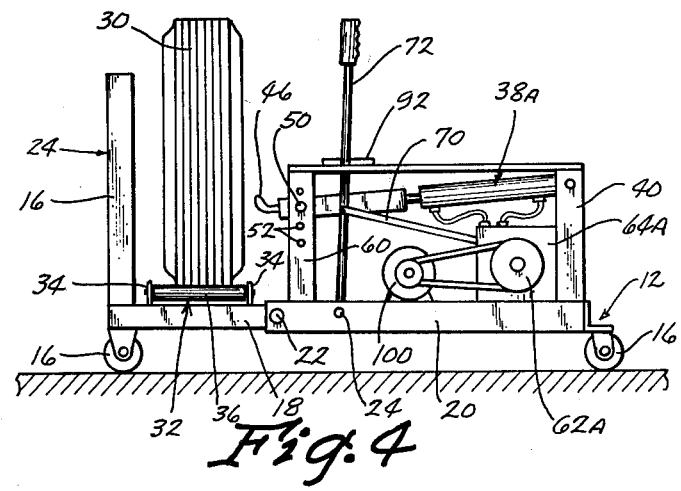
FIG. 4 is a side elevation view of an alternate embodiment.

An alternate embodiment of this invention is seen in FIG. 4 wherein the pump 62A is driven by a motor 100 positioned on the standard frame portion 20. A reservoir tank 64A is also positioned on the standard frame member 20. The hydraulic cylinder 38A has in effect changed positions with the power means from that of FIG. 2 and is pivotally connected to the top end of the post 40 and extends outwardly and downwardly where it is supported on the pin 50 in one of the openings 52 in the post 60. Thus the bead-engaging tool 46 engages the bead 102 of the tire 30 relative to the rim 104 by extending slightly downwardly rather than upwardly as seen in FIG. 2. It has been found that better bead-breaking action is obtained when the bead-breaking tool extends either upwardly or downwardly rather than straight in horizontally.

I claim:

1. A tire changing machine comprising,
   a T-shaped frame including a standard and a cross member and said standard having a pair of telescopically extendable portions,
   ground-engaging casters at opposite ends of said cross member and at the free end of said standard,
   an upstanding tire engaging post at the free end of said standard,
   a tire support cradle on one of said telescopic standard portions adjacent said post, said cradle extending parallel to said cross member and having rollers at opposite ends,
   a hydraulic cylinder pivotally connected to said other telescopic frame portion and positioned to extend at an angle to the horizontal;
   and a bead-engaging tool on the outer free end of said cylinder for engaging the bead of a tire on said cradle support,
   a second upstanding post, said second post being on said other telescopic frame portion adjacent said tire support cradle, and
   adjustment support means on said second post for selectively vertically pivotally adjusting said cylinder in the desired angular position, said adjustment means including said second upstanding post having a pair of spaced apart plate members, said tool extending between said plate members and a bolt means being selectively vertically positioned between said plate members to support said tool to allow the tool to freely pivot upwardly relative to the bolt means as the tool moves along the curvature of the tire.

2. The structure of claim 1 wherein an upstanding control lever is pivotally connected to said frame and is operatively connected to said hydraulic cylinder.

3. The structure of claim 1 wherein said cylinder and bead-engaging tool are in a common plane with said tool being higher than said cylinder.

4. The structure of claim 1 wherein said cylinder and bead-engaging tool are in a common plane with said tool being lower than said cylinder.

5. The structure of claim 1 wherein said tire-engaging post includes telescopically extendable portions.

* * * * *